Nov. 18, 1958  M. BERG  2,861,115

BATTERY PLATE AND TAB ASSEMBLY

Filed Feb. 20, 1956

INVENTOR.
MARCUS BERG
BY
Lindsey and Preitzman
ATTORNEYS

United States Patent Office 2,861,115
Patented Nov. 18, 1958

2,861,115

BATTERY PLATE AND TAB ASSEMBLY

Marcus Berg, Easthampton, Mass., assignor to Nickel Cadmium Battery Corporation, Easthampton, Mass., a corporation of Delaware Application February 20, 1956, Serial No. 566,465

4 Claims. (Cl. 136—28)

The present invention relates to alkaline storage batteries of the nickel-cadmium type and more particularly to an improved electrode plate and tab assembly for use in such batteries.

The preferred type of electrode plate for use in nickel-cadmium type storage batteries is comprised of a nickel or nickel coated wire grid on which has been sintered a porous nickel powder plaque, which latter material, subsequent to formation of the plaque, is impregnated with the active materials. The nickel wire grid functions as a reinforcing member for the plate and also as an electrical conductor.

In making up a battery, it is necessary to provide means for connecting the individual plates to the battery terminals which preferably takes the form of a tab or extension on the grid of the plate. The provision of a suitable connector tab for battery plates of the type referred to here has long been a problem inasmuch as the securing of the tab or forming it integrally with the grid prior to formation of the plaque interferes with the mass production of the plates while attachment of the tabs to the plates after the formation of the plates usually results in a poor mechanical and electrical connection and in addition frequently creates side effects of a deleterious nature.

For example, if the tabs are attached to or made integral with the grid prior to formation of the plaque, the plates have to be handled or treated separately in the sintering and impregnating operations instead of being treated in the form of a large sheet which can be later separated into the smaller individual plates. In addition, the presence of preformed tabs during the sintering and impregnating operations requires the provision of molds and handling apparatus of special and expensive design to accommodate the tabs and even then it is difficult to avoid contamination of the tabs. When the tabs are attached after the formation of the plaque it is exceedingly difficult to form a good electrical and mechanical contact with the grid because of the presence of the plaque and impregnation materials. Mechanical connections, in general, are inferior from an electrical standpoint and usually are too bulky for practical use. Spot welding, as heretofore practiced, produces a weak bond and many rejects because the metal of the tab will not properly fuse with the metal of the grid, possibly as a result of the physical contamination of the surfaces to be joined or the presence of the hydroxide impregnation materials which produces an evolution of gases when heat is applied. In addition, conventional plates with spot welded tabs are frequently found to have a reduced useful life as a result of the apparent deposition of minute quantities of contaminating materials having a tendency to cause shorts.

Accordingly, it is an aim of the present invention to provide a terminal tab construction which can be efficiently and effectively applied to the plates after the same have been completely formed and dimensioned for use in a battery. Included in this aim is an arrangement for applying terminal tabs to the plates after formation of the plaques which will produce consistently good results, including good rigidity and electrical contact, and which in particular will not be adversely affected by gas evolution and which will not introduce material into the assembly having a later deleterious effect upon the operation of the battery.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
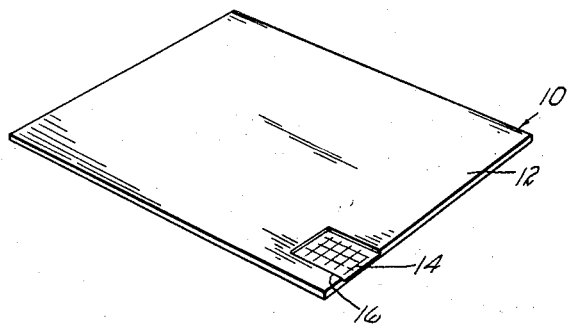
Fig. 1 is a perspective view of a battery plate having a portion thereof coined for the reception of the connecting tab.

Referring to the drawings, the battery plate 10 may be formed in the usual manner, i. e., by applying nickel powder indicated at 12 to either or both sides of a nickel grid 14 which is formed into a self-supporting coating by sintering. The sintered nickel powder portion of the plate which contains approximately 80% voids is impregnated with the usual active materials such as nickel or cadmium hydroxide. It is the usual practice to form a plurality of the plates 10 in a single operation as a single sheet following which the individual plates 10 of desired dimension are severed from the main sheet.

To form a tab locating area, the plate 10 is coined as indicated at 16, to form a compacted area of approximately the maximum thickness of the wire grid 14. Since the nickel powder layer contains approximately 80% voids, it is possible by the application of pressure to compress the powder layers to form the area 16 as indicated. The coining operation is preferably carried out by the use of a compacting die in a press which is adjusted to produce just enough compacting to expose the surface of the grid. As will be appreciated, the coining operation can be carried out prior to the separation of the original sheet into the separate plates 10.

Figure 2:
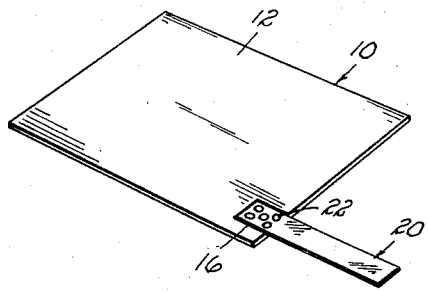
Fig. 2 is a perspective view to a diminished scale of the plate of Fig. 1 with the tab attached.
Figure 3:
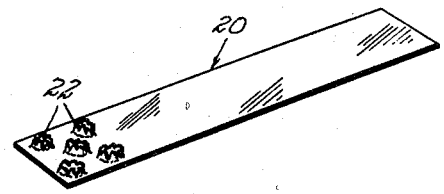
Fig. 3 is an enlarged perspective view of the tab prior to attachment to the plate and in a position inverted from that shown in Fig. 2.

In accordance with the invention, the tab 20 is formed of nickel strip material and it is punched at one end to form a plurality of struck-up projections 22. Although in the specific example the strip is shown as formed with five projections 22, it will be realized that a lesser or greater number may be utilized. The cross-sectional size of the projections 22 is preferably small enough to enter through the interstices of the grid and preferably of sufficient length to project entirely therethrough when the tab is placed as shown in Fig. 2. In the specific embodiment shown in the drawings, the projections 22 are generally frusto-conical in shape which can be produced by a conventional punching operation, the outer edge of the projections 22 being of a jagged nature which facilitates the embedding of the projections into the grid during the subsequent forming operation.

Figure 4:
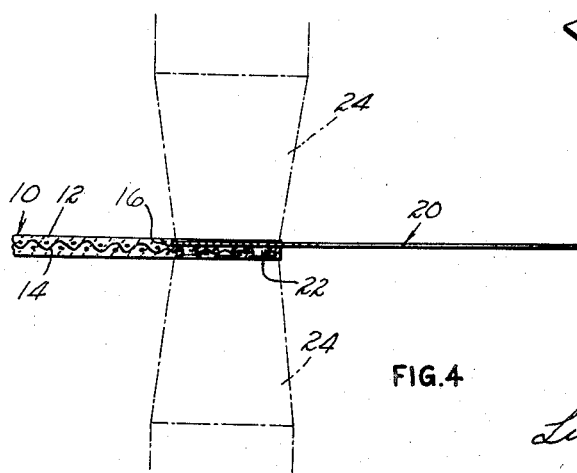
Fig. 4 is a fragmentary cross-sectional view of the battery plate and connecting tab in the process of formation, the electrodes of the spot welding apparatus being shown in phantom.

Although it would be possible to apply the tabs 20 to the plates in a mechanical operation prior to spot welding, it is an advantage of the method of the present invention that this may be accomplished by the use of the spot welding equipment itself in a single operation. As illustrated in Fig. 4 of the drawings, the tab 20 is located on the plate 10 with the projections disposed over the coined area 16 and is then inserted between the electrodes 24 of a spot welder. When the electrodes 24 are moved in a closing direction the first effect is to bend over the outer edge of the projections 22 to cause the same to engage with the opposite side of the grid 14, as indicated, and then when the electrodes are energized the projections are heated to the fusion point preferably sufficient to weld the tab and its projections to the wire grid on both sides of the grid.

During the energizing of the electrodes 24 it will be realized that considerable heat is generated in the vicinity of the tab and the coined portion 16 of the plate and since the plate is impregnated with hydroxide material, there is caused a generation or evolution of gas in the weld zone which normally is sufficient to disturb the registry of the tab and the plate so as to cause an unsatisfactory joining of the tab and plate characterized by both poor physical and electrical properties. An unexpected advantage of the present invention is that the openings formed in the tab 20 by the punching of the projections 22 apparently permit a release of the gases without interference with the joining of the tab and plate.

Another unexpected advantage of the present invention is that the use of tabs as described permits the use of a spot welder having electrodes 24 which are formed of nickel or nickel-coated metal. Heretofore, the use of nickel electrodes has not been feasible because the generation of heat caused the electrodes to stick to the tab with the result that other types of electrodes such as copper electrodes had to be substituted. Despite the brief period during which the spot welding takes place it has been found that when copper electrodes are utilized there is a sufficient deposition of copper to cause copper to appear during the operation of the battery having a noticeable shorting effect on the plates. In accordance with the present invention, the spot welding of the tabs 20 having the preformed projections 22 apparently dissipates or transfers the heat or causes the generation of the heat to take place in such manner that there is no sticking of the electrodes even though the electrodes are formed of nickel or nickel coated metal, with the result that the final plate will not evidence in use the deleterious shorting effect due to the presence of copper and the like which has been inherent in the operation of plates formed heretofore with welded tabs.

The plate and tab assembly of the present invention is characterized by a strong metal to metal bond between the tab and grid having optimum electrical and mechanical characteristics and free of contaminating deposits which insures a long service life and the avoidance of defective plate and tab assemblies which have heretofore been a factor in rendering the fabrication and assembly of alkaline storage batteries with sintered plates an expensive and difficult operation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. An elecrode plate for alkaline storage battery cells comprising a metallic grid, a porous plaque of sintered nickel powder particles supported by the grid, said plaque being compressed in an area lying along one edge of the plate to form an indented zone of reduced cross section, and a metal tab overlying the grid in said indented zone, said tab being formed with integral projections on the side overlying the compacted area and extending through the grid to the other side thereof, the ends of the projections being bent into engagement with said other side of the grid, and said tab and projections being fused to the grid.

2. An electrode plate for alkaline storage battery cells comprising a nickel surfaced grid, a porous plaque of sintered nickel powder particles embedding the grid, said plaque being compacted in an area lying along one edge of the plate wherein the plaque is compacted to approximately the maximum thickness of the grid, a nickel tab of elongated strip form having one end overlying the compacted area, said one end having struck-up projections extending through the grid and deformed into engagement with the grid on the side opposite from the tab, said tab and projections being fused to the grid.

3. An electrode plate for alkaline storage battery cells comprising a nickel surfaced grid, a porous plaque of sintered nickel powder particles embedding the grid, said plaque being compacted in an area lying along one edge of the plate, a flat nickel tab having one end overlying the compacted area, said one end being provided with struck-up tubular projections forming through openings in the tab, said projections extending through the grid and being reversely bent into engagement with the opposite side of the grid, said tab and projections being fused to opposite sides of the grid.

4. An electrode plate for alkaline storage battery cells comprising a metallic grid, a porous plaque of sintered nickel powder particles supported on the grid and compressed in an area lying along an edge of the plate providing an indented zone of reduced cross-section exposing the surface of the grid, and a metal tab overlying the indented zone and extending outwardly from the plate, said tab being formed with holes in the portion thereof overlying the indented zone and being fused to the grid.

References Cited in the file of this patent

UNITED STATES PATENTS

| | | |
|---|---|---|
| 2,450,655 | Goldsworthy | Oct. 5, 1948 |
| 2,515,204 | Evans | July 18, 1950 |
| 2,672,494 | Fleischer | Mar. 16, 1954 |
| 2,708,211 | Koren et al. | May 10, 1955 |